United States Patent [19]

Asbury, Jr. et al.

[11] Patent Number: 4,925,521
[45] Date of Patent: May 15, 1990

[54] APPARATUS FOR INTERMITTENTLY APPLYING LENGTHS OF THERMOPLASTIC TAPE

[75] Inventors: Charles E. Asbury, Jr.; Monmohan S. Gulati, both of Vancouver, Wash.; Earle C. Sherman; Dan V. Calvert, both of Grand Junction, Colo.

[73] Assignee: H.B. Fuller Company, Vancouver, Wash.

[21] Appl. No.: 214,727

[22] Filed: Jul. 1, 1988

[51] Int. Cl.⁵ .............................................. B32B 31/18
[52] U.S. Cl. .................................... 156/517; 156/256; 156/519; 156/521; 156/552; 156/556; 156/583.3; 156/DIG. 21; 156/DIG. 36; 83/117; 83/346; 83/347; 83/348
[58] Field of Search ............... 156/250, 256, 497, 517, 156/519, 520, 521, 522, 552, 556, 566, 567, 582, 583.3, DIG. 21, DIG. 36; 83/117, 343, 346, 345, 347, 348

[56] References Cited

U.S. PATENT DOCUMENTS

| | | |
|---|---|---|
| 37,446 | 1/1863 | Hull . |
| 244,845 | 7/1881 | Bowles .................................. 83/117 |
| 1,196,986 | 9/1916 | Roney . |
| 2,183,722 | 12/1939 | Newman ............................... 83/343 |
| 2,205,573 | 6/1940 | Medwick et al. ..................... 83/346 |
| 2,449,047 | 9/1948 | Anderson ............................. 164/68 |
| 2,449,298 | 9/1948 | Hoppe ......................... 156/DIG. 36 |
| 2,483,458 | 10/1949 | Fischer et al. ......................... 216/29 |
| 2,719,336 | 10/1955 | Stotler ................................... 19/155 |
| 2,729,028 | 1/1956 | Slayter et al. ......................... 83/347 |
| 2,745,491 | 5/1956 | Sonneborn et al. .................. 164/61 |
| 2,990,081 | 6/1961 | De Neui et al. ...................... 156/519 |
| 3,227,024 | 1/1966 | Krebs .................................... 83/568 |
| 3,355,995 | 12/1967 | Borkmann et al. .......................... 93/1 |
| 3,438,835 | 4/1969 | Chen et al. ........................... 156/522 |
| 3,485,120 | 12/1969 | Keith ...................................... 83/37 |
| 3,835,756 | 9/1974 | Bosse ................................... 156/519 |
| 3,926,708 | 12/1975 | Long ..................................... 156/242 |
| 3,954,034 | 5/1976 | Broderick ............................. 83/346 |
| 4,181,558 | 1/1980 | Neubronner ........................ 156/355 |
| 4,203,270 | 5/1980 | Forman ................................. 53/133 |
| 4,285,758 | 8/1981 | Clausen et al. ...................... 156/498 |
| 4,288,280 | 9/1981 | Morin ................................... 156/510 |
| 4,406,196 | 9/1983 | Roncato et al. ...................... 83/117 |
| 4,411,644 | 10/1983 | Tinklenberg ........................ 493/213 |
| 4,453,990 | 6/1984 | Takahashi .............................. 156/66 |
| 4,468,274 | 8/1984 | Adachi ........................ 156/DIG. 36 |

FOREIGN PATENT DOCUMENTS 2243815 11/1975 France .
1425165 5/1972 United Kingdom .
1558998 7/1976 United Kingdom .
2159761A 12/1985 United Kingdom .

OTHER PUBLICATIONS

Straub Design Company, Model FSA 100 Flat Surface Tape Applicator brochure.
LM-0800 16 Inch Hot Wheel Operating Manual, H.B. Fuller Co. St. Paul, MN 55108 Rev. 11/87.

Primary Examiner—Caleb Weston
Attorney, Agent, or Firm—Klarquist, Sparkman, Campbell, Leigh & Whinston

[57] ABSTRACT

An apparatus is disclosed which applies hot melt tape to substrates such as cartons or boxes which are fed through the apparatus in a timed, spaced manner. The requirement of applying the tape to each spaced carton is met by integrating the feeding and cutting of the tape to the timing of the carton or box feeding machine. The tape is applied to a predetermined location with a desired cut length determined by the configuration of the apparatus. The apparatus can be mounted on existing machines such as folder gluers or mounted on dedicated machines.

6 Claims, 4 Drawing Sheets

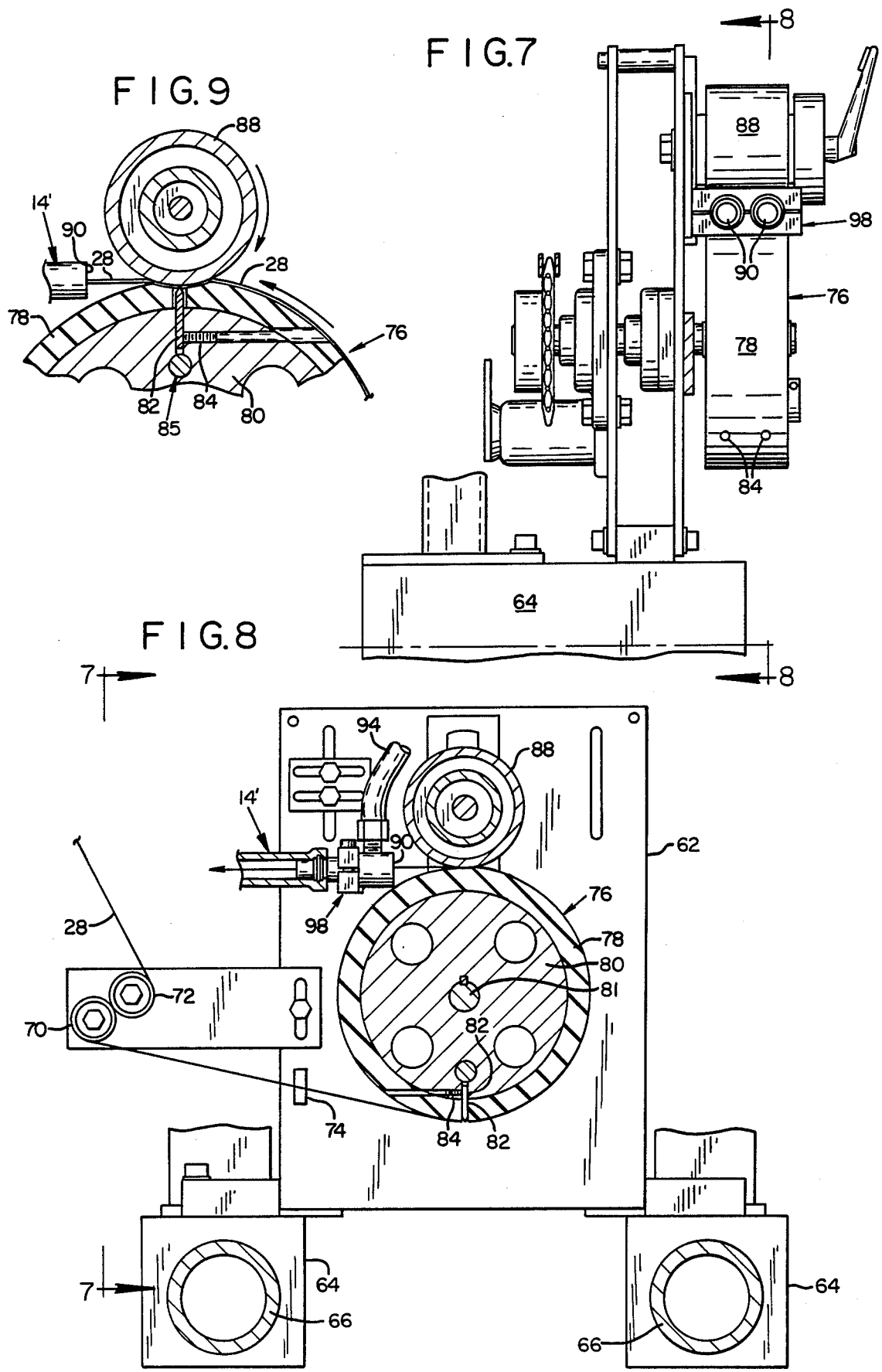

APPARATUS FOR INTERMITTENTLY APPLYING LENGTHS OF THERMOPLASTIC TAPE

FIELD OF THE INVENTION

The preferred embodiment of the present invention relates to systems for dispensing and applying tape, and more particularly to systems for intermittently dispensing and applying thermoplastic tape to articles conveyed along a conveyor system.

BACKGROUND OF THE INVENTION

Modern consumer and industrial packaging often includes thermoplastically bonded tear tapes and reinforcing tapes as part of their constructions. Machines have been devised to apply these tapes in continuous fashion to packaging cartons conveyed adjacent one another on a conveyor. A much more difficult problem is posed if the packaging materials are placed at spaced intervals along the conveyor and if it is desired that only a short length of the tape be thermoplastically bonded to each. No satisfactory technique has heretofore been proposed to solve this problem.

Accordingly, there remains a need for a method and apparatus for applying short strips of tape to packaging materials that are conveyed in spaced relationship along a packaging line.

It is a principal object of the present invention to fulfill this need.

According to the present invention, an intermittent tape applicator is disclosed that consists of three major subassemblies: a tape dispensing subassembly, a tape strip transport subassembly and a thermobonding subassembly. The tape dispensing subassembly includes spindle-mounted tape spools for supplying thermoplastic tape to the applicator. The tension in the tape caused by unrolling from the spools is isolated from the remainder of the apparatus by a pair of nip rollers so as to improve consistency in length of tape cuts. From the nip rollers, the tape is routed through a cutting/feeding mechanism which determines the length of the tape strip. This mechanism is indexed to a predetermined application region on the articles (typically carton blanks) carried by a conveyor system.

The cutting/feeding mechanism consists of a rubber coated knife wheel, the circumference of which determines the cut length of tape. The tape strip is cut by a blade recessed below the rubber surface of the knife wheel that is exposed when the rubber portion of the wheel is depressed by engagement with a hardened anvil wheel. A leading edge of each tape strip cut thereby is pulled into an air flow amplifier unit, which is driven with low pressure compressed air so as to present a vacuum to the incoming tape strip. The tape is pulled by this vacuum into a transfer tube coupled to the air flow amplifier unit until its trailing end is cut by the next action of the knife blade against the anvil wheel. The tape then accelerates to the thermobonding subassembly at a rate controllable by air volume/pressure controls.

The thermobonding subassembly consists of a pair of endless thin steel bands mounted together so that the carton blank on the conveyor passes between them without slipping. The upper band is heated by a stationary hot shoe which heats the tape to its application temperature as it passes through the bands with the carton blank. The carton blank acts as a heat sink to help cool and solidify the tape after it leaves the thermobonding subassembly. A pressure point at the exit of the thermobonding subassembly provides a fixed and controllable nip which improves the uniformity of the tape application.

The foregoing and additional objects, features and advantages of the present invention will be more readily apparent from the detailed description, which proceeds with reference to the accompanying drawings.

BRIEF DESCRIPTION OF THE DRAWINGS

FIG. 7 is a side view of a tape dispensing portion of the tape applicator of FIG. 2.

FIG. 8 is a section view taken on line 8—8 of FIG. 7 showing the tape dispensing portion of the tape applicator of FIG. 2.

FIG. 9 is an enlarged section detail showing the cooperative engagement between an anvil wheel and a knife wheel in the tape applicator of FIG. 2.

DETAILED DESCRIPTION

Figure 1:
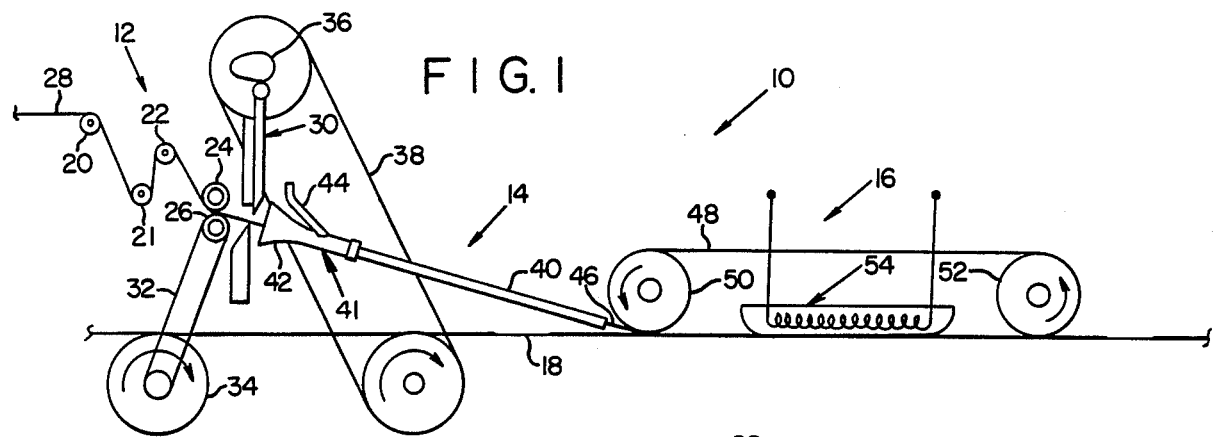
FIG. 1 is a schematic front view of a tape applicator according to one embodiment of the present invention.

Referring to FIG. 1, an intermittent tape applicator 10 according to a first embodiment of the present invention includes a tape dispensing assembly 12, a tape transport assembly 14 and a thermobonding assembly 16. Tape is cut into strips of a desired length by tape dispensing assembly 12. These strips then are conveyed by the transport assembly 14 to the thermobonding assembly 16. The thermobonding assembly 16 heats the strips of tape and presses them against articles (typically carton blanks) that are conveyed on a conveyor system 18.

Tape dispensing assembly 12 includes first, second and third tensioning rollers 20, 21 and 22 and first and second nip rollers 24, 26. A thermoplastic tape 28, provided from a spool or other supply means (not shown), is routed around the tensioning rollers 20–22 to provide tape at a substantially constant tension. Nip rollers 24, 26 pinch the tape and controllably advance it at a fixed rate into a reciprocating cutter portion 30 of the dispensing assembly 12. The fixed rate at which the nip rollers advance the tape is established by a mechanical drive linkage 32 coupling nip roller 26 to a drive wheel 34 of the conveyor system 18. In a typical embodiment, this linkage 32 is geared to advance the tape 28 from the nip rollers 24, 26 at a rate less than the rate at which the conveyor 18 moves, as described further below.

The tape 28 advanced from the nip rollers 24, 26 is cut into lengths by the reciprocating knife 30. Knife 30 is spring biased upwardly and is urged downwardly by engagement with a cam member 36. This cam member 36 is mechanically driven from the conveyor system 18 by a second linkage 38. The second linkage 38 is typically geared to cut one length of tape for each carton blank on the conveyor as the carton blank passes by.

The tape 28 used with this tape applicator apparatus is desirably not limp. Instead, it is desirably comprised of materials which afford it some degree of rigidity. Consequently, the tape advanced by the nip rollers 24, 26 extends through the cutter portion and continues into an inlet 42 of the transport assembly 14. The transport assembly 14 is comprised of an air flow amplifier 41 that includes two inlets, the inlet 42 into which the tape is introduced and a second inlet 44 into which pressurized air is introduced. These two inlets connect to a hollow tube 40 that has an outlet 46 at its distal end. When the knife 30 cuts the tape, the cut length is free to be accelerated by the pressurized air as it rushes to escape out the outlet 46. (Pressurized air introduced into inlet 44 does not escape through inlet 42 due to the angled relationship of the two inlets. In fact, the introduction of pressurized air into inlet 44 tends to draw a vacuum at inlet 42. This vacuum acts to draw the strip of tape into tube 40).

At the outlet 46 of hollow tube 40, the accelerated tape strip exits with the escaping pressurized air and is directed under a steel band 48 carried by drive wheels 50, 52. Steel band 48 acts to press the strip of tape against a carton blank (not shown in FIG. 1) carried by the conveyor. An electrical resistance heater 54 heats the steel band 48 and causes the hot melt resin on the tape to melt. The pressure of the band 48 onto the tape causes the tape to bond to the carton blank beneath it, thereby completing the operation.

Figure 2:
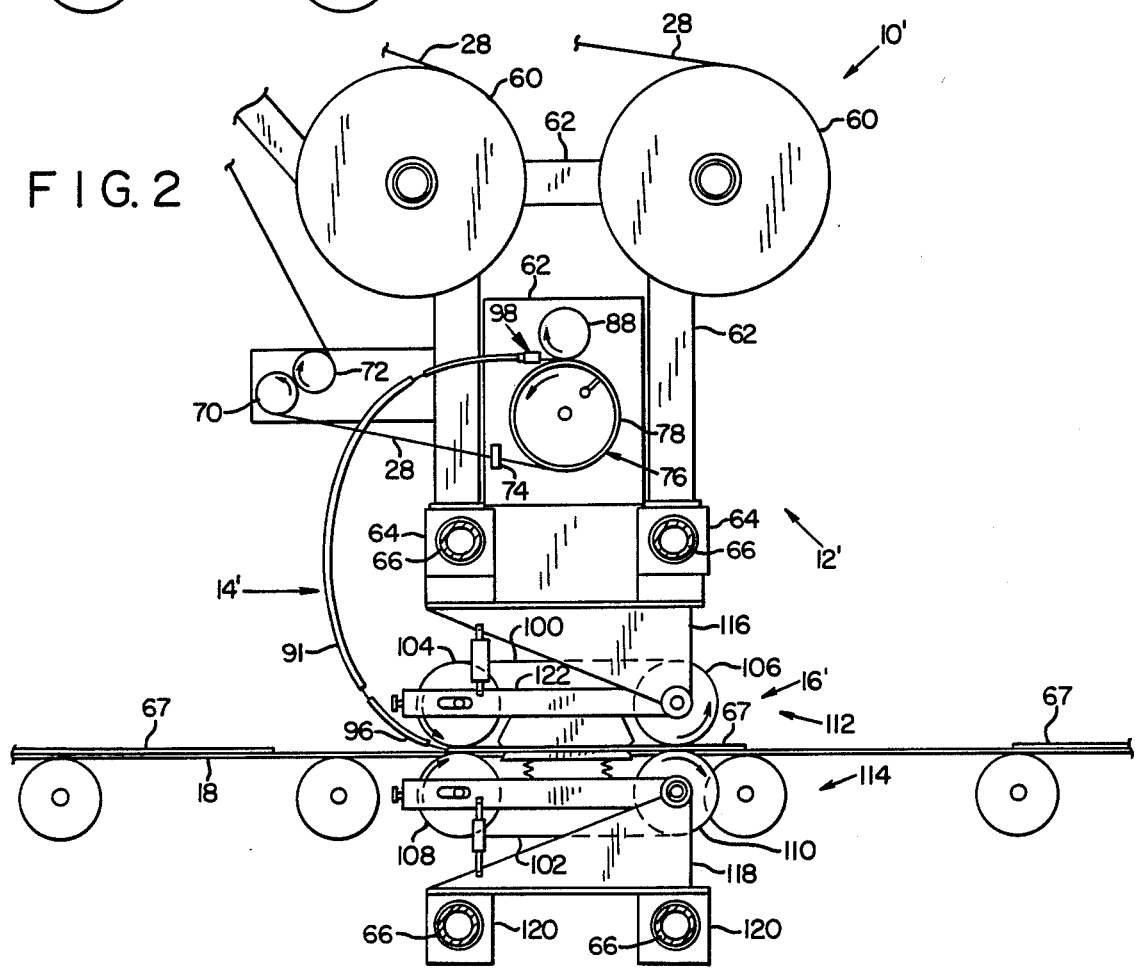
FIG. 2 is a front view showing a tape applicator according to a second embodiment of the present invention and also showing part of a conveyor system that carries carton blanks to which tapes are to be applied through the apparatus.
Figure 3:
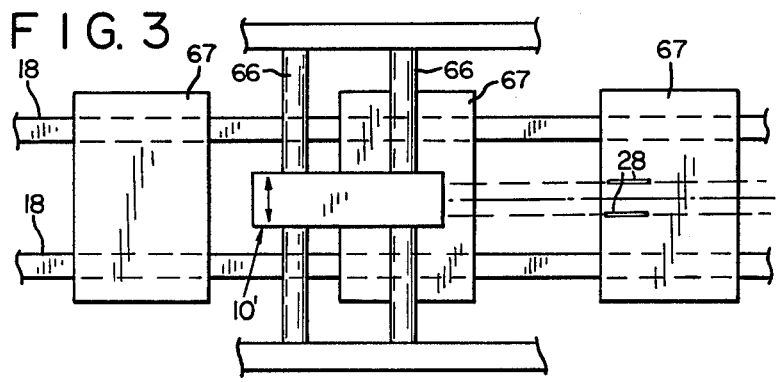
FIG. 3 is a schematic top plan view showing a portion of an industrial packaging line incorporating the tape applicator of the present invention and also showing a conveyor system carrying carton blanks and a mounting arrangement employed to position the tape applicator at a desired position relative to the carton blanks.

In a typical operation, the carton blanks to which the lengths of tape are to be bonded may be 30 inches long and may be spaced 60 inches (center to center) from the adjacent cartons on the conveyor. (FIG. 3 shows an illustrative packaging line in which the tape applicator of FIG. 2 is used). It may be desired to bond a 10 inch strip of tape to each of the cartons, for example, to reinforce a cut-out handle portion. The conveyor 18 may be running at 60 inches per second (i.e. one article conveyed through the apparatus every second). Thus the apparatus must lay down one 10-inch strip of tape every second, or every 60 inches of conveyor length.

If this ratio of 10 inches of tape per 60 linear inches of conveyor is to be achieved, the apparatus 10 must provide a gap of 50 inches between tape applications. To dispense 10 inches of tape every second requires that the tape be advanced off a supply spool at this same rate. (This is effected by arranging the nip roller drive linkage 32 of FIG. 1 to drive the nip rollers 24, 26 at a linear rate one-sixth that of the conveyor speed). However, once the tape exits the outlet port 46 of the hollow tube 40, it is pressed against the racing conveyor 18 and is suddenly accelerated to the conveyor speed of 60 inches per second. This acceleration leaves a gap between the trailing end of the tape being applied to the article and the leading end of the tape being dispensed off the nip rollers 24, 26 (at the dispensing speed of 10 inches per second). Thus, the acceleration of the cut tape from its initial speed of 10 inches per second to its final speed of 60 inches per second yields the necessary 50 inch gap between tapes applied to articles on the conveyor.

FIGS. 2 and 4-11 show another embodiment 10' of the present invention. Like the embodiment 10 shown in FIG. 1, the FIG. 2, etc. embodiment includes a tape dispensing assembly 12', a transport assembly 14' and a thermobonding assembly 16'. The transport assembly 14' and the thermobonding assembly 16' operate on basically the same principles as the FIG. 1 embodiment, as discussed in further detail below. The tape dispensing assembly 12', however, operates on a different principle.

Figure 4:
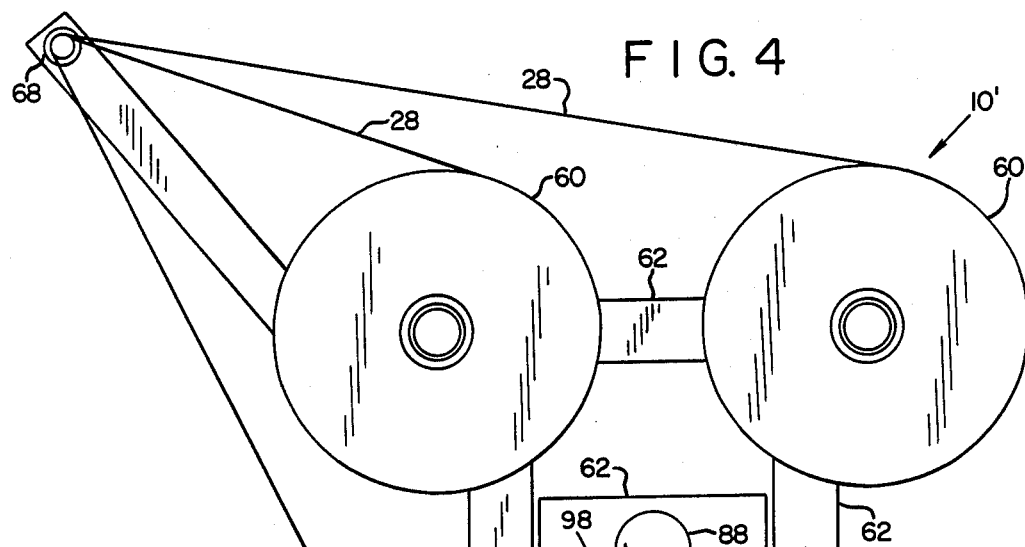
FIG. 4 is a more detailed front view of the tape applicator of FIG. 2.

Referring more particularly to FIGS. 2 and 4, the tape dispensing assembly 12' includes one or more spools 60 of tape. (The FIG. 2, etc. embodiment is designed to apply two tapes in side-by-side arrangement to each article carried on the conveyor. In alternative embodiments, a greater or lesser number of tapes could of course be applied.) Tape spools 60 are rotatably mounted on a framework 62 to which the transport assembly 14' and the thermobonding assembly 16' are also fastened. Framework 62, in turn, is slidably mounted by mounting blocks 64 onto tubes 66 (FIG. 3) which span the path of the conveyor 18. This mounting arrangement permits the tape applicator 10' to be positioned at any position over the conveyor belt so that tape may be applied to any portion of the carton blanks 67 carried thereby. In one embodiment, the spools 60 include a mechanical or magnetic braking system to impede their rotation so that excess tape is not unnecessarily unspooled.

Tapes 28 from spools 60 are routed over a pair of guide rollers 68 (FIG. 4) and continue on to a pair of nip rollers 70, 72. Nip rollers 70, 72 do not advance the tape as they did in the FIG. 1 embodiment, but instead serve to isolate the remainder of the dispensing assembly 12' from changes in tape tension. From nip rollers 70, 72, the tape 28 is routed through a guide 74 and to a knife wheel 76.

Referring more particularly now to FIGS. 8 and 9, the knife wheel 76 includes an elastically deformable outer portion 78 made of a material such as polyurethane rubber. This rubber portion 78 is bonded to a metal hub 80 which in turn is rotatably mounted on an axle 81 extending out to framework 62. Recessed within wheel 76 and extending out towards the periphery of rubber outer portion 78 is a metal knife blade 82. Knife blade 82 is held in the desired position by a squaring mechanism 85 (described below) and one or more set screws 84. The knife wheel 76 is rotatably driven from the conveyor assembly 18 by a chain drive linkage 86 which is normally geared to rotate the knife wheel once per carton blank 67 that passes below on the conveyor.

The tape 28 approaching knife wheel 76 from tape guide 74 is held onto the knife wheel by virtue of the knife wheel's engagement with a rotatably mounted anvil wheel 88. Anvil wheel 88 is positioned, as shown in FIG. 9, to deform the rubber portion 78 of the knife wheel 76 with which it is engaged. This arrangement pinches the tape between the knife and anvil wheel. It is this pinching action which permits the knife wheel/anvil wheel combination to pull tape 28 from the spools 60 and to dispense the tape to the transport mechanism 14'. (In the preferred embodiment, the anvil wheel 88 is made of hardened metal. In other embodiments, of course, alternate materials could readily be used.)

In addition to their role in advancing the tape, the knife wheel and anvil wheel also cooperate to cut the tape. When the knife blade 82 embedded in the knife wheel 76 reaches top dead center (as shown in FIG. 9), it is urged against the anvil wheel 88 and severs the tape 28 pinched therebetween. The two cut ends of the tape, however, are not free to move. They are still constrained by the pinching action of the anvil and knife wheels on either side of the blade 82, as shown in FIG. 9. This pinching action extends for about one-half inch on each side of the blade.

When the knife wheel 76 thereafter continues its rotation to the left past top dead center, the cut trailing end of the tape strip to the left of the blade is released into an inlet 90 of the transport assembly 14'. This cut length of tape is then transported by the transport assembly to the thermobonding assembly 16' where it is thermobonded to the carton blank 67 on the conveyor passing thereunder. The cut leading end of the tape to the right of the blade 82 simultaneously begins its advancement into inlet 90 under the control of the knife and anvil wheels.

When the knife wheel 76 next reaches top dead center, the tape that has been metered into the transport assembly 14' during the wheel's rotation is cut and is soon released from the pinching action. It too is then conveyed to the thermobonding assembly for application to the next article carried by the conveyor. Thus, it will be recognized that the illustrated anvil/knife wheel combination exerts positive control over the tape throughout the dispensing process until the tape is finally released to the transport assembly.

Figure 5:
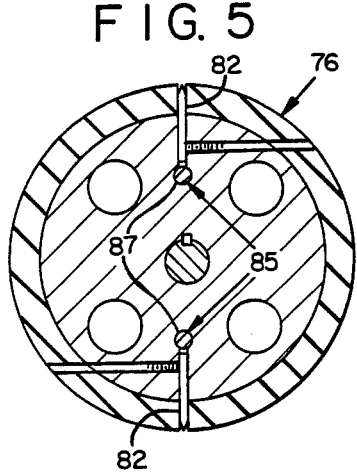
FIG. 5 is a section view of an alternative knife wheel incorporating two knife blades that may be employed in the tape applicator of FIG. 2.
Figure 6:
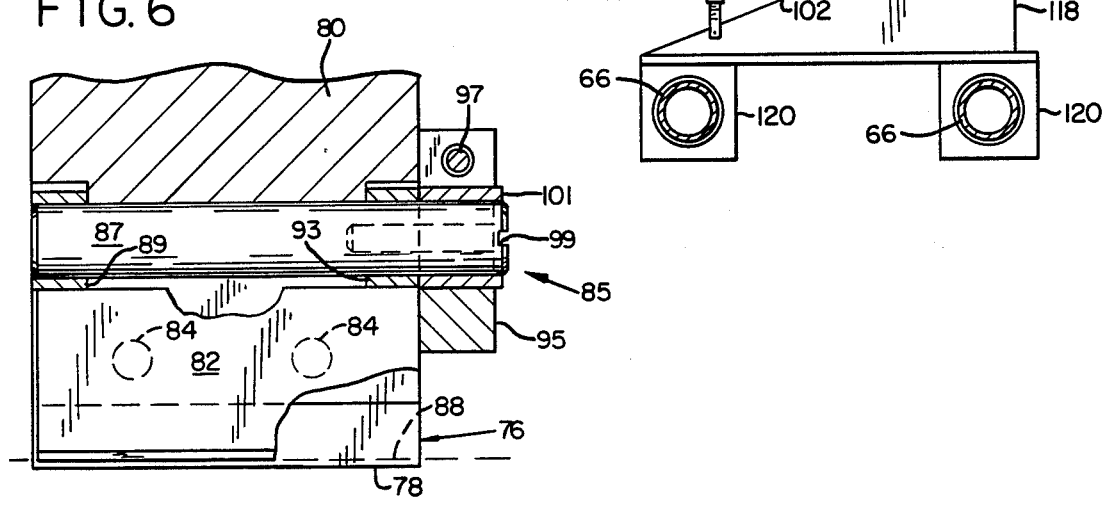
FIG. 6 is a section view taken along lines 6—6 of FIG. 4, with parts broken away, showing an arrangement for adjusting the position of a knife blade in a knife wheel to insure that the edge of the knife blade is parallel to the anvil wheel.
Figure 10:
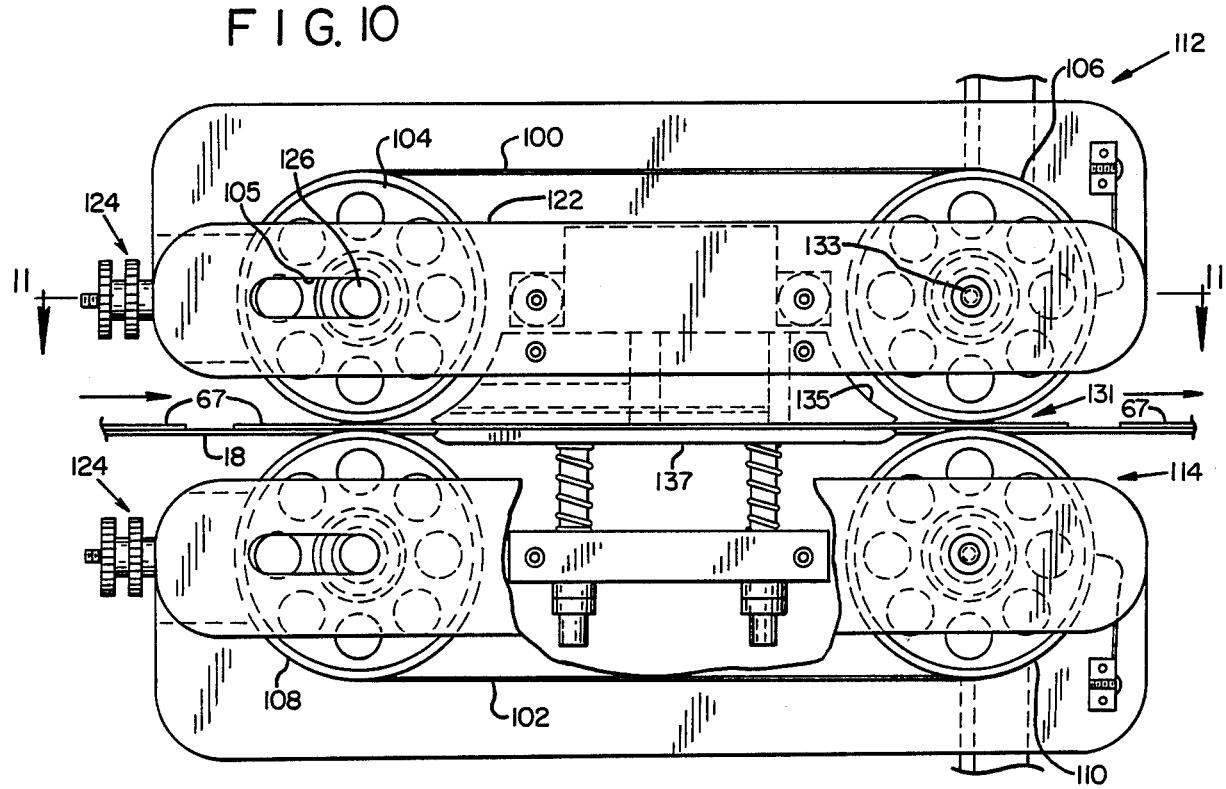
FIG. 10 is a front view, with parts broken away, of the thermobonding portion of the tape applicator of FIG. 2.
Figure 11:
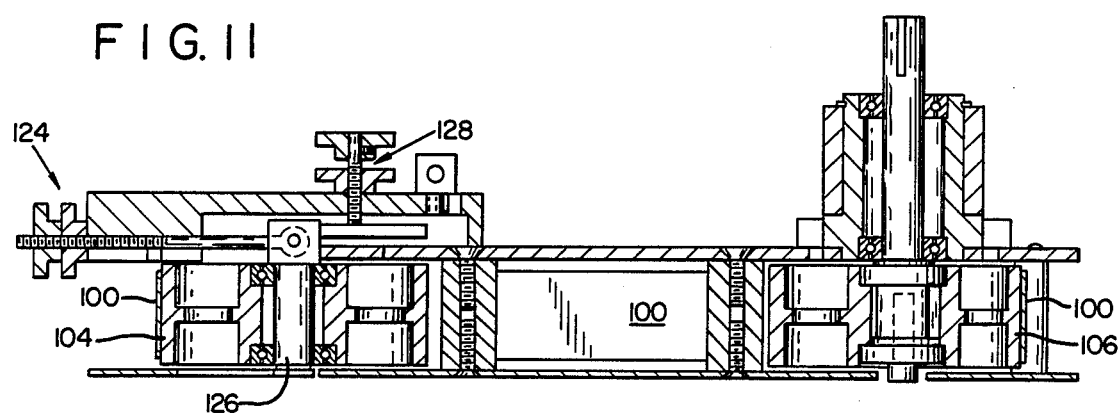
FIG. 11 is a section view taken on line 11—11 of FIG. 10.

It will also be recognized that the cut strips of tapes that are produced by this apparatus have lengths that equal the circumference of the knife wheel. In order to obtain the above-noted pinching action for one-half inch either side of the knife blade 82, it has been found that a knife blade diameter of five to eight inches is desired. This yields tape lengths of approximately 15 to 25 inches. If shorter lengths are desired, rather than use a smaller knife wheel, it is preferable to put two or more knife blades 82 in the knife wheel, spaced equiangularly around its periphery, as shown in FIG. 5. By this technique, tapes of arbitrarily short lengths can be cut without compromising the desired pinching action on either side of the knife blade.

In the preferred embodiment, a knife blade squaring mechanism 85 (FIG. 6) is desirably used to insure that the cutting edge of the knife blade 82 engages the anvil wheel 88 squarely. It will be recognized that since the knife and anvil wheels are about two inches thick, a slight misalignment of either of these wheels or of the two-inch long knife blade may leave a gap between one end of the knife blade and the corresponding region on the anvil wheel. This gap could permit tape to pass between the anvil and knife wheels without being cut.

To avoid this problem, the butt end of the knife blade 82 rests on a device that permits an end of the blade to be raised or lowered a slight amount until it is "square" relative to the anvil wheel. This device is a shaft 87 that extends through the knife wheel and includes first and second bushings 89, 93 on the ends thereof. The first bushing 89 is concentric with the shaft 87. The second bushing 93, however, is eccentric and serves as a cam which raises and lowers that end of the blade. The cam eccentricity is on the order of 10 mils.

To square the knife blade with the anvil wheel, the screws 84 holding the blade in position are loosened. The shaft 87 is then turned by a screwdriver in slot 99 until the edge of the knife blade is exactly parallel to the anvil wheel. A clamp collar 95 positioned exterior of the knife wheel is then tightened by a bolt 97 onto a bushing 101 that is on the shaft 87 but external to the wheel 76 so as to hold the shaft in the desired orientation. The knife blade is then secured in its position by retightening the screws 84.

The transport assembly 14' used in the FIG. 2, etc. embodiment is similar to that employed in the FIG. 1 embodiment. It includes a hollow tube 91 with two inlets 90, 94 and one outlet 96. Cut strips of tape are introduced into inlet 90 and are accelerated by the pressurized air introduced into inlet 94. The cut strips existing from outlet 96 are directed into the thermobonding assembly 16'.

In the illustrated embodiment, an air flow amplifier 98, model number W1110-09090F manufactured by Schraeder Bellows Division of Scovill, Inc. (Akron, Ohio) is used as the inlet portion of the transport assembly 14'. Although not visible from the outside (illustrated in FIG. 8), the two inlet ports 90, 94 on this component have the angled relationship shown schematically in FIG. 1 which causes a vacuum to be drawn on one inlet when pressurized gas is introduced into the other. The air flow amplifier 98 is equipped with a vernier dial to control the introduction of pressurized gas into the component. This control is used advantageously to adjust the position at which tape is thermobonded to the conveyed articles, as discussed below.

As mentioned earlier in connection with FIG. 1, it is in this transport subassembly 14' of the present invention that the spacing between tape strips is achieved. It was earlier noted that the tape strip is accelerated from the slow rate at which it is dispensed from the spool to the fast rate at which the conveyor runs simply by action of the thermobonding assembly pressing the leading end of the tape against the carton 67 on the conveyor. While such an arrangement is operative, it has been found advantageous to accelerate the tape strip as it travels through the transport system so that the timing of the tape application can be better controlled.

Returning to FIG. 2, it will be recognized that the tape strip cannot have a length longer than the tube 91 comprising the transport assembly. If it does, the tape will be pulled at its bottom end at the fast conveyor rate while its upper end is still being dispensed from the knife wheel at the much slower dispensing rate. Consequently, the tape will break.

If the length of the tape strip precisely matches the length of the hollow tube 91, then the instant the cut tape is released from the knife/anvil wheels at its top end, it will be grabbed by the thermobonding assembly at its bottom end. Consequently, the tape will be applied to whatever portion of the carton blank 67 is entering the thermobonding assembly 16' at that instant. While the knife wheel 76 is generally always driven at a rate that it cuts one tape strip per carton blank on the conveyor below, its angular orientation must be precisely preset relative to the positions of carton blanks on the conveyor if the tapes are to be positioned properly on the carton blanks in such an embodiment.

More desirable is an arrangement wherein the length of the tape strip is shorter than the length of the hollow tube 91. In such an embodiment, the tape strip has a latency period during which it is travelling through the tube, after it has been released from the pinching action of the knife/anvil wheel and before it is engaged by the thermobonding assembly. This latency period can be controlled by adjusting the rate at which the pressurized gas flows through the tube 91. If the gas is introduced at a higher pressure, the tape strip will be accelerated faster, decreasing the time interval until the tape exits the tube. Conversely, if the gas is introduced at a lower pressure, the tape strip will be accelerated relatively slower, thereby increasing the time interval until the tape exits the tube. By controllably adjusting the introduction of gas into the tube 91 or by using the vernier on the air flow amplifier 98, the position at which the tapes are applied to carton blanks carried by the conveyor can be varied.

In actual operation, the initial angular orientation of the knife wheel 76 is preset so that tape strips cut when the knife blade reaches top dead center will in approximately the correct position when they are applied to the carton blanks 67 on the conveyor 18. The apparatus is then started and the actual position of the tape strips on the carton blanks is set to its precise desired value by adjustment of the air flow amplifier vernier or by changing the pressure of the gas entering inlet 94. Thereafter, due to the fixed relationship imposed by the knife wheel drive linkage 86, the tape strips are applied repeatedly to the same position on all subsequent carton blanks.

The thermobonding portion 16' of the FIG. 2, etc. embodiment is similar to that of the FIG. 1 embodiment but is here illustrated in greater detail and so is described accordingly.

Returning now to FIGS. 4, 10 and 11, the thermobonding portion 16' includes first and second steel bands 100, 102, each stretched taut and driven by wheels 104, 106, 108 and 110. At least one of wheels 104, 106 is driven from the conveyor system 18 so that the steel bands travel at the same linear speed as the conveyor. The upper portion 112 of the thermobonding assembly is disposed above the plane of the conveyor 18 and is fastened to the basic framework 62 by a flange 116. The lower portion 114 of this assembly is disposed beneath the plane of the conveyor and is fastened to a second framework 118 which in turn is slidably fastened to the transversely extending tubes 66 (FIG. 3) by blocks 120. Like the upper framework, the mounting of the lower framework 118 on these tubes 66 permits the position of this portion of the assembly to be positioned at any desired location relative to the carton blanks carried on the conveyor.

Returning again to the top portion 112 of the thermobonding assembly, the two wheels 104, 106 are rotatably mounted on a bar 122. The left-most wheel 104 is mounted in a slot 105 that permits the wheel to be moved to permit tightening of the steel band 100. This tensioning arrangement, includes a thumb wheel drive screw 124 to which the axle 126 of wheel 104 is mounted. A second thumb wheel drive screw arrangement 128 (FIG. 11) permits the tracking of the steel band 100 on the wheels 104, 106 to be adjusted so that the steel band does not "walk" off the wheels. Bar 122 can be lifted, and with it wheel 104, by a hydraulic cylinder 129 if desired. The other wheel 106 of the top portion 112 is fixed in position and, in cooperation with wheel 110 below, establishes the dimension of a pressure point 131 (FIG. 10) through which the tape/carton blank combination must pass. In a typical application, the pressure point dimension is set to one or two mils less than the final thickness of the tape/carton combination to insure a good bond has been established. This dimension is set by adjusting an eccentric bushing 133 to which wheel 106 is mounted. This bushing allows up to 50 mils variation in wheel position.

Between wheels 104 and 106 is an electric hot shoe 135 which heats the thin steel belt 100 passing thereunder. This hot shoe heats the tape to its application temperature (200° F. typical) as it passes through the bands on top of the carton. The carton acts as a heat sink to help cool and solidify the tape after it leaves the thermobonding assembly. A corresponding spring loaded pressure pad 137 is positioned beneath the lower steel band 102 and serves to support the steel bands and the cartons conveyed therebetween as they are heated by the electric hot shoe 135 immediately above.

Having described and illustrated the principles of our invention in an illustrative embodiment, it should be apparent to those skilled in the art that the invention can be modified in detail and arrangement without departing from such principles. For example, while the present invention has been described in an application in which cartons are spaced uniformly along a continuously moving conveyor, the apparatus can readily be adapted for use with untimed machines in which the cartons are spaced randomly or move incrementally. Such an adaptation can, for example, employ sensors to determine the positions of the carton blanks and to initiate the application of tape in response thereto.

More generally, the knife wheel/anvil wheel combination and the novel use of the air flow amplifier disclosed herein have myriad applications far removed from the tape applicator apparatus with which they have been illustrated. Consequently, the above disclosure is to be taken only as illustrative of one use of the novel technology of the present invention and not as a limitation thereon. Accordingly, we claim as our invention all such modifications as may come within the scope and spirit of the following claims and equivalents thereof.

We claim:

1. An apparatus for applying a thermoplastic tape to an article conveyed by a transport system comprising:
   means for dispensing thermoplastic tape;
   cutting means for cutting a length of said tape,
   applicator means for receiving said cut length of thermoplastic tape from the cutting means and for thermobonding said length of tape to an article conveyed by the transport system;
   guide means for guiding said cut length of tape from the cutting means to the applicator means; and
   air driven motive means for moving said cut length of tape through the guide means;
   wherein the cutting means includes:
   an anvil wheel;
   a knife wheel have an elastically deformable outer portion and having a knife blade recessed slightly from an outer periphery thereof;
   drive means for rotating at least one of said wheels;
   the anvil wheel cooperating with the knife wheel to advance a continuous piece of thermoplastic tape therebetween and to deform the elastic portion of the knife wheel to permit the knife blade to cut the thermoplastic tape against the anvil wheel.

2. The apparatus of claim 1 in which the drive means includes means linking the rotational speed of said one of said wheels to the speed of said transport system.

3. The apparatus of claim 1 in which the anvil wheel and the knife wheel are sized and positioned to pinch the thermoplastic tape securely on both sides of the knife blade when the knife blade cuts against the anvil wheel.

4. The apparatus of claim 1 which further includes means for adjusting the alignment of the knife blade in the knife wheel.

5. An apparatus comprising:
 an anvil wheel;
 a knife having an elastically deformable outer portion and having a knife blade recessed slightly from an outer periphery thereof;
 drive means for rotating at least one of said wheels;
 the anvil wheel being positioned to cooperate with the knife wheel to advance a continuous length of an elongated material therebetween and to deform the elastic portion of the knife wheel to permit the knife blade to cut the elongated material into predetermined lengths against the anvil wheel; and
 means for adjusting the alignment of the knife blade in the knife wheel, said means including an eccentric bushing on which the knife blade rests and means for changing the angular orientation of said bushing to change the alignment of the knife blade.

6. The apparatus of claim 5 in which the anvil wheel and the knife wheel are sized and positioned to pinch the elongated material securely on both sides of the knife blade when the knife blade cuts against the anvil wheel.

* * * * *

UNITED STATES PATENT AND TRADEMARK OFFICE
CERTIFICATE OF CORRECTION

PATENT NO. : 4,925,521

DATED : May 15, 1990

INVENTOR(S) : Charles E. Asbury, Jr.

It is certified that error appears in the above-identified patent and that said Letters Patent is hereby corrected as shown below:

ON TITLE PAGE:

[75] Inventors, Delete "Monmohan" and insert

--Manmohan--.

Signed and Sealed this

Twenty-seventh Day of August, 1991

Attest:

HARRY F. MANBECK, JR.

*Attesting Officer*          *Commissioner of Patents and Trademarks*